United States Patent
Ghule et al.

(10) Patent No.: US 12,170,647 B2
(45) Date of Patent: Dec. 17, 2024

(54) INTERNET PROTOCOL (IP) VERSION 6 FRAGMENTATION AND REASSEMBLY OPTIMIZATION FOR PORT-AWARE IP TRANSLATORS

(71) Applicant: Juniper Networks, Inc., Sunnyvale, CA (US)

(72) Inventors: Ashish Suresh Ghule, Bangalore (IN); Alex Baban, San Jose, CA (US); Pratik Pradip Vyas, Bengaluru (IN)

(73) Assignee: Juniper Networks, Inc., Sunnyvale, CA (US)

( * ) Notice: Subject to any disclaimer, the term of this patent is extended or adjusted under 35 U.S.C. 154(b) by 305 days.

(21) Appl. No.: 17/849,036

(22) Filed: Jun. 24, 2022

(65) Prior Publication Data
US 2023/0421535 A1    Dec. 28, 2023

(51) Int. Cl.
  *H04L 9/40*     (2022.01)
  *H04L 45/74*    (2022.01)
  *H04L 61/251*   (2022.01)

(52) U.S. Cl.
CPC .......... *H04L 63/0236* (2013.01); *H04L 45/74* (2013.01); *H04L 61/251* (2013.01); *H04L 63/1466* (2013.01)

(58) Field of Classification Search
None
See application file for complete search history.

(56) References Cited

U.S. PATENT DOCUMENTS

| | | | |
|---|---|---|---|
| 6,742,045 B1 * | 5/2004 | Albert | H04L 69/16 370/236 |
| 8,462,654 B1 * | 6/2013 | Gieger | H04L 47/41 370/252 |
| 8,699,511 B1 * | 4/2014 | Gieger | H04L 12/413 370/431 |
| 11,165,701 B1 * | 11/2021 | Ghule | H04L 61/251 |
| 11,451,585 B2 * | 9/2022 | Ghule | H04L 45/72 |
| 11,570,283 B1 * | 1/2023 | Ghule | H04L 63/1483 |

(Continued)

FOREIGN PATENT DOCUMENTS

EP    3570524 A1 *   11/2019   ......... H04L 12/4633

OTHER PUBLICATIONS

Li et al., "Mapping of Address and Port using Translation (MAP-T)," Internet Engineering Task Force (IETF), Standards Track, Jul. 2015, 27 Pages.

(Continued)

*Primary Examiner* — Jeffrey R Swearingen
(74) *Attorney, Agent, or Firm* — Harrity & Harrity, LLP (57) ABSTRACT

A network device may receive IPv6 fragments of a flow. Source and/or destination port information may be encoded into an upper sixteen bits of an identification number of an IPv6 fragment header of each of the IPv6 fragments. The network device may extract the source and/or destination port information from the IPv6 fragments, and may perform a spoof check of the IPv6 fragments. The network device may drop any of the IPv6 fragments that fail the spoof check, to generate remaining IPv6 fragments, and may translate the remaining IPv6 fragments into IPv4 fragments based on the source and/or destination port information. The network device may forward the IPv4 fragments toward an IPv4 cloud network.

20 Claims, 8 Drawing Sheets

(56) References Cited

U.S. PATENT DOCUMENTS

2018/0294993 A1* 10/2018 Poulin .................. H04L 47/825
2019/0356591 A1* 11/2019 Ghule ................. H04L 12/4633
2022/0046116 A1    2/2022 Carter et al.
2022/0303231 A1*  9/2022 Yu ........................... H04L 45/64

OTHER PUBLICATIONS

Li et al., "IP/ICMP Translation Algorithm," Internet Engineering Task Force (IETF), Standards Track, Apr. 2011, 33 Pages.
Bonica et al., "IP Fragmentation Considered Fragile; rfc8900.txt," Internet Engineering Task Force, IETF; Standard, Internet Society (ISOC), Sep. 2020, pp. 1-15, XP015142105, [Retrieved from the Internet: URL:https://tools.ietf.org/html/rfc8900 [retrieved on Sep. 12, 2020].
Extended European Search Report for Application No. EP22190252.1 mailed on Dec. 14, 2022, 7 pages.
Troan et al., "Mapping of Address and Port with Encapsulation (MAP-E); rfc7597 .txt", Internet Engineering Task Force, IETF, Standard, Internet Society (ISOC), Jul. 2015, pp. 1-35, XP015107651.

* cited by examiner

INTERNET PROTOCOL (IP) VERSION 6 FRAGMENTATION AND REASSEMBLY OPTIMIZATION FOR PORT-AWARE IP TRANSLATORS

BACKGROUND

Mapping of address and port using translation (MAP-T) is a stateless mapping and dual translation technique, which is a 4-over-6 Internet protocol version 6 (IPv6) transition technique.

SUMMARY

Some implementations described herein relate to a method. The method may include receiving IPv6 fragments of a flow, where source and/or destination port information is encoded into an identification number of an IPv6 fragment header of each of the IPv6 fragments. The method may include extracting the source and/or destination port information from the IPv6 fragments, and performing a spoof check of the IPv6 fragments. The method may include dropping any of the IPv6 fragments that fail the spoof check, to generate remaining IPv6 fragments, and translating the remaining IPv6 fragments into IP version 4 (IPv4) fragments based on the source and/or destination port information. The method may include forwarding the IPv4 fragments toward an IPv4 cloud network.

Some implementations described herein relate to a network device. The network device may include one or more memories and one or more processors. The one or more processors may be configured to receive IPv6 fragments of a flow, where source and/or destination port information is encoded into an IPv6 fragment header of each of the IPv6 fragments. The one or more processors may be configured to extract the source and/or destination port information from the IPv6 fragments, and perform a spoof check of the IPv6 fragments. The one or more processors may be configured to drop any of the IPv6 fragments that fail the spoof check, to generate remaining IPv6 fragments, and may translate the remaining IPv6 fragments into IPv4 fragments based on the source and/or destination port information. The one or more processors may be configured to forward the IPv4 fragments toward an IPv4 public Internet.

Some implementations described herein relate to a non-transitory computer-readable medium that stores a set of instructions for a network device. The set of instructions, when executed by one or more processors of the network device, may cause the network device to receive IPv6 fragments of a flow, and perform a spoof check on a first IPv6 fragment of the flow. The set of instructions, when executed by one or more processors of the network device, may cause the network device to drop the first IPv6 fragment, when the first IPv6 fragment fails the spoof check, and translate remaining IPv6 fragments, and the first IPv6 fragment, when the first IPv6 fragment passes the spoof check, into IPv4 fragments. The set of instructions, when executed by one or more processors of the network device, may cause the network device to forward the IPv4 fragments toward an IPv4 cloud network.

DETAILED DESCRIPTION

The following detailed description of example implementations refers to the accompanying drawings. The same reference numbers in different drawings may identify the same or similar elements.

MAP-T is a technology that connects IP version 4 (IPv4) endpoints over an IPv6 service provider (SP) network using IPv4 to IPv6, and IPv6 to IPv4, translation mechanisms. For example, an IPv4 host device (e.g., a user device) may connect with a network device (e.g., a customer premises equipment (CPE)), and the CPE may connect with the IPv6 SP network. The IPv6 SP network may connect with another network device (e.g., a border relay (BR)), and the BR may connect with an IPv4 cloud network. The CPE and the BR may utilize MAP-T for BR upstream traffic and BR downstream traffic. The BR upstream traffic (e.g., IPv6 traffic from the IPv6 SP network toward the BR) may be translated to IPv4 and forwarded toward IPv4 cloud network. The BR downstream traffic (e.g., IPv4 traffic from the IPv4 cloud network toward BR) may be translated to IPv6 and forwarded toward the IPv6 SP network. MAP-T may define a MAP-T IPv6 maximum transmission unit (MTU) which determines whether IPv6 packets need to be fragmented.

In the BR upstream direction, IPv6 packets require spoof checks before being translated to IPv4 packets. Spoof packets may be dropped. For IPv6 fragments, this requires the BR to perform native IPv6 reassembly (e.g., full or partial) based on Layer 4 port information (e.g., source and/or destination port information) that is only available in a first IPv6 fragment. In the BR downstream direction, large unfragmented IPv4 packets, with sizes greater than a MAP-T IPv6 MTU, require translation to IPv6 by the BR, such that the translated IPv6 packets are further fragmented as per the MAP-T IPv6 MTU. This requires the BR to provide native IPv6 fragmentation support. However, the BR may not support IPv6 reassembly and/or IPv6 fragmentation.

Thus, current techniques for performing MAP-T for BR upstream traffic and BR downstream traffic consume computing resources (e.g., processing resources, memory resources, communication resources, and/or the like), networking resources, and/or the like, associated with failing to identify spoofed traffic that causes a network outage or damage to devices, failing to provide native IPv6 fragmentation support for BR downstream traffic, failing to drop spoofed traffic, handling lost traffic caused by failing to perform spoof checks and/or IPv6 fragmentation support, and/or the like.

Some implementations described herein relate to a network device (e.g., a BR), without native IPv6, that transmits and receives IPv6 fragments. For example, a network device may receive IPv6 fragments of a flow. Source and/or destination port information may be encoded into an upper sixteen bits of an identification number of an IPv6 fragment header of each of the IPv6 fragments. The network device may extract the source and/or destination port information from the IPv6 fragments, and may perform a spoof check of the IPv6 fragments. The network device may drop any of the IPv6 fragments that fail the spoof check, to generate remaining IPv6 fragments, and may translate the remaining IPv6 fragments into IPv4 fragments based on the source and/or destination port information. The network device may forward the IPv4 fragments toward an IPv4 cloud network.

In this way, the network device, without native IPv6, transmits and receives IPv6 fragments. For example, the network device may provide stateless solutions that may be utilized in the absence of native IPv6 fragmentation and/or IPv6 reassembly support being provided in the network device. The network device may perform functions that achieve a same end result as MAP-T, but without compromising MAP-T performance. Thus, the network device conserves computing resources, networking resources, and/or the like that would otherwise have been consumed by failing to identify spoofed traffic that causes a network outage or damage to devices, failing to provide native IPv6 fragmentation support for BR downstream traffic, failing to drop spoofed traffic, handling lost traffic caused by failing to perform spoof checks and/or IPv6 fragmentation support, and/or the like.

FIGS. 1A-1D are diagrams of an example 100 associated with transmitting and receiving IPv6 fragments via a network device without native IPv6. As shown in FIGS. 1A-1D, example 100 includes a user device (e.g., an IPv4 private host), a network device (e.g., a CPE), an IPv6 service provider network (e.g., associated with a MAP domain), another network device (e.g., a BR), and an IPv4 cloud network (e.g., an IPv4 public Internet). The user device may connect with the CPE, and the CPE may connect with the IPv6 SP network. The IPv6 SP network may connect with the BR, and the BR may connect with the IPv4 cloud network. The CPE and the BR may utilize MAP-T for BR upstream traffic and BR downstream traffic. Further details of the user device, the CPE, the IPv6 service provider network, the BR, and the IPv4 cloud network are provided elsewhere herein.

Figure 1A:
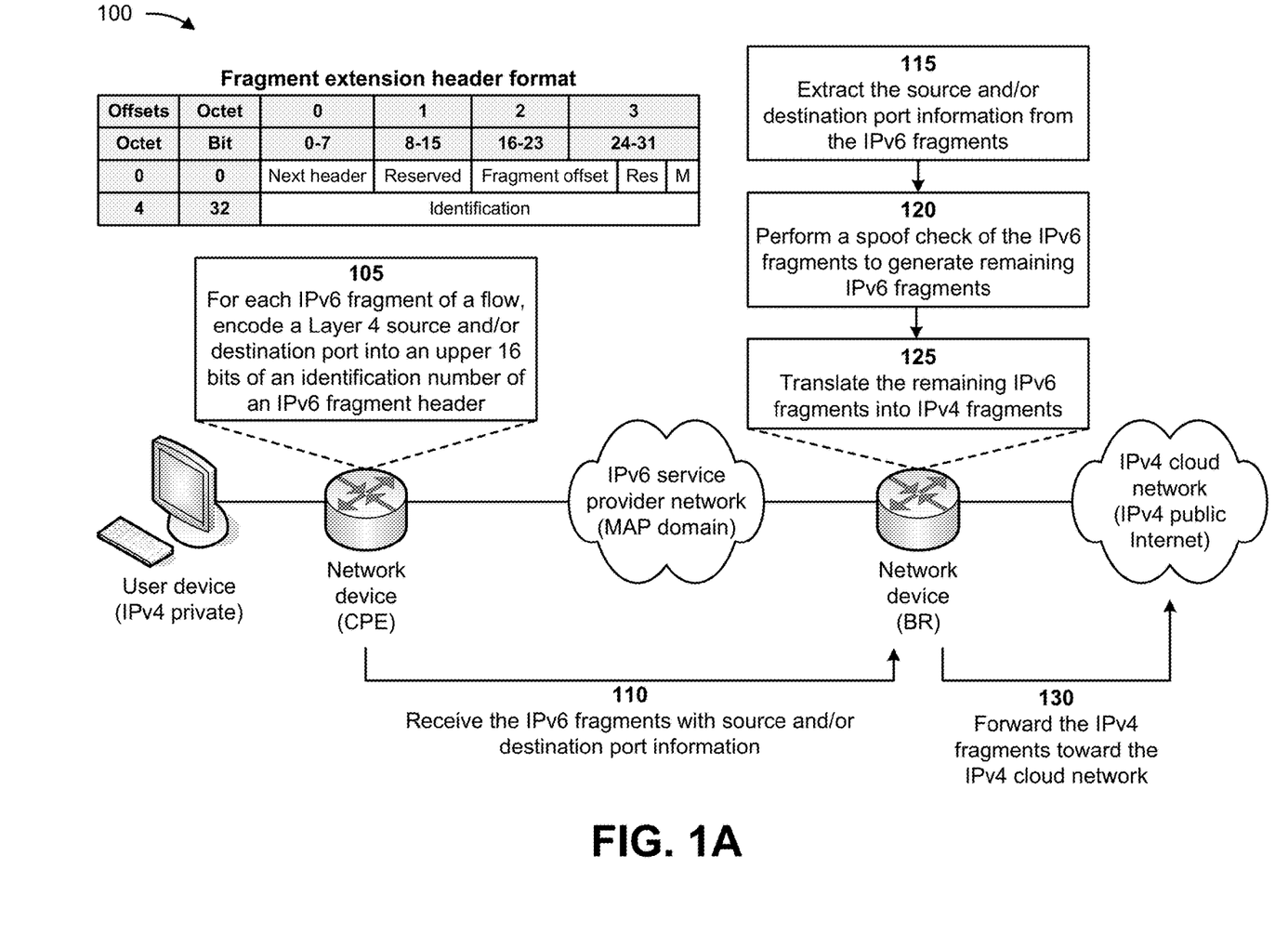
FIGS. 1A-1D are diagrams of an example associated with transmitting and receiving IPv6 fragments via a network device without native IPv6.

As shown in FIG. 1A, and by reference number 105, the CPE, for each IPv6 fragment of a flow, may encode a Layer 4 source and/or destination port into an upper sixteen (16) bits of an identification number of an IPv6 fragment header. For example, the user device may generate the flow (e.g., an IPv4 traffic flow) that is to be provided to the IPv4 cloud network, and may provide the flow to the CPE. The CPE may fragment the IPv4 flow into IPv4 fragments, and may translate the IPv4 fragments into IPv6 fragments. In some implementations, for each IPv6 fragment, the CPE may encode the Layer 4 source and/or destination port into (e.g., an upper sixteen bits of) an identification number (e.g., thirty-two bits) of an IPv6 fragment header of each IPv6 fragment. In this way, the BR may receive source and/or destination port information with every IPv6 fragment, eliminating a need for native IPv6 reassembly by the BR. The BR may extract the source and/or destination port information for each IPv6 fragment from the upper sixteen bits of the identification number of the IPv6 fragment header, and continue MAP-T processing of each IPv6 fragment (e.g., performing a spoof check and an IPv4 translation into an IPv4 fragment).

As further shown in FIG. 1A, and by reference number 110, the BR may receive the IPv6 fragments with source and/or destination port information from the CPE, via the IPv6 SP network. For example, the CPE may provide the IPv6 fragments, with the source and/or destination port information, to the IPv6 SP network, and the IPv6 SP network may forward the IPv6 fragments to the BR. The BR may receive the IPv6 fragments, with the source and/or destination port information, from the IPv6 SP network.

As further shown in FIG. 1A, and by reference number 115, the BR may extract the source and/or destination port information from the IPv6 fragments. For example, the BR may extract the source and/or destination port information for each IPv6 fragment from the upper sixteen bits of the identification number of the IPv6 fragment header.

As further shown in FIG. 1A, and by reference number 120, the BR may perform a spoof check of the IPv6 fragments to generate remaining IPv6 fragments. For example, the BR may perform a MAP-T spook check of the IPv6 fragments based on the source and/or destination port information associated with the IPv6 fragments. If an IPv6 fragment is associated with a source and/or destination port that is spoofed, the BR may drop the IPv6 fragment from the flow. If an IPv6 fragment is associated with a source and/or destination port that is not spoofed, the BR may keep the IPv6 fragment as one of the remaining IPv6 fragments. In some implementations, if all of the IPv6 fragments pass the spoof check (e.g., do not include spoofed source and/or destination port information), the remaining IPv6 fragments may correspond to all of the IPv6 fragments.

As further shown in FIG. 1A, and by reference number 125, the BR may translate the remaining IPv6 fragments into IPv4 fragments. For example, the BR may utilize MAP-T to translate the remaining IPv6 fragments into the IPv4 fragments. With MAP-T, the BR may translate the remaining IPv6 fragments into the IPv4 fragments using mapping rules that calculate addresses and ports based on information embedded in the IPv6 fragments (e.g., the source and/or destination port information).

As further shown in FIG. 1A, and by reference number 130, the BR may forward the IPv4 fragments toward the IPv4 cloud network. For example, the BR may forward the IPv4 fragments toward a destination address associated with the IPv4 cloud network. In some implementations, the destination address may be associated with another user device communicating via the IPv4 cloud network, with a virtual machine of the IPv4 cloud network, with a server device of the IPv4 cloud network, and/or the like. The BR may forward the IPv4 fragments to the IPv4 cloud network, and the IPv4 cloud network may forward the IPv4 fragments to the destination address. A device associated with the destination address may receive the IPv4 fragments from the IPv4 cloud network and may reassemble the IPv4 fragments into the IPv4 traffic flow generated by the user device.

Figure 1B:
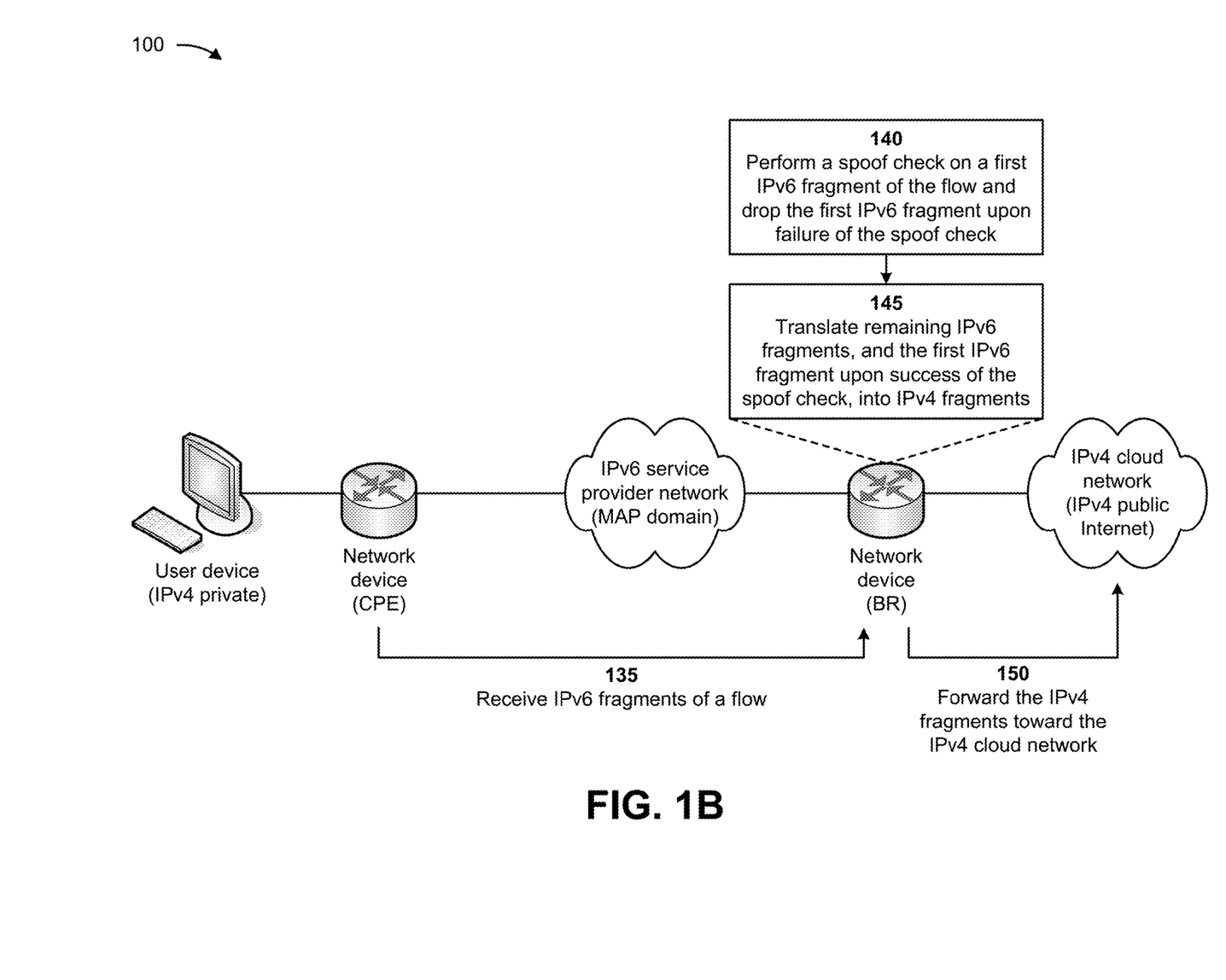

As shown in FIG. 1B, and by reference number 135, the BR may receive IPv6 fragments of a flow. For example, the CPE may be unable to encode the source and/or destination port information into an upper sixteen bits of an identification number of an IPv6 fragment header of each IPv6 fragment. Thus, the IPv6 fragments may not include the source and/or destination port information as described above in connection with FIG. 1A. In such situations, the CPE may provide the IPv6 fragments, without the source and/or destination port information, to the IPv6 SP network, and the IPv6 SP network may forward the IPv6 fragments to the BR. The BR may receive the IPv6 fragments, without the source and/or destination port information, from the IPv6 SP network.

As further shown in FIG. 1B, and by reference number 140, the BR may perform a spoof check on a first IPv6 fragment of the flow and may drop the first IPv6 fragment upon failure of the spoof check. For example, the BR may perform a MAP-T spook check of the first IPv6 fragment of the flow (e.g., which includes source and/or destination port information). If the first IPv6 fragment fails the spoof check (e.g., includes a spoofed port), the BR may drop the first IPv6 fragment from the flow. If the first IPv6 fragment passes the spoof check (e.g., does not include a spoofed port), the BR may keep the first IPv6 fragment with the flow.

As further shown in FIG. 1B, and by reference number 145, the BR may translate remaining IPv6 fragments, and the first IPv6 fragment upon success of the spoof check, into IPv4 fragments. For example, since the remaining IPv6 fragments (e.g., the non-first IPv6 fragments) do not include source and/or destination portion information, the BR may skip the spoof check for the remaining IPv6 fragments. The BR may unconditionally translate the remaining IPv6 fragments into the IPv4 fragments. If the first IPv6 fragment passes the spoof check, the BR may also translate the first IPv6 fragment into a first IPv4 fragment of the IPv4 fragments. In some implementations, the BR may utilize MAP-T to translate the remaining IPv6 fragments, and the first IPv6 fragment upon success of the spoof check, into the IPv4 fragments. With MAP-T, the BR may translate the remaining IPv6 fragments, and the first IPv6 fragment upon success of the spoof check, into the IPv4 fragments using the mapping rules described above.

As further shown in FIG. 1B, and by reference number 150, the BR may forward the IPv4 fragments toward the IPv4 cloud network. For example, the BR may forward the IPv4 fragments toward a destination address associated with the IPv4 cloud network. The BR may forward the IPv4 fragments to the IPv4 cloud network, and the IPv4 cloud network may forward the IPv4 fragments to the destination address. A device associated with the destination address may receive the IPv4 fragments from the IPv4 cloud network and may reassemble the IPv4 fragments into the IPv4 traffic flow generated by the user device. In some implementations, the device associated with the destination address may reassemble the IPv4 fragments into the IPv4 traffic flow when the IPv4 fragments include the first IPv4 fragment (e.g., a genuine or non-spoofed flow). However, for a spoofed flow, only the remaining IPv4 fragments, and not the first IPv4 fragment, will be forwarded toward the IPv4 cloud network. In such situations, the device associated with the destination address may fail to reassemble the remaining IPv4 fragments (e.g., without the first IPv4 fragment) and may discard the remaining IPv4 fragments.

Figure 1C:
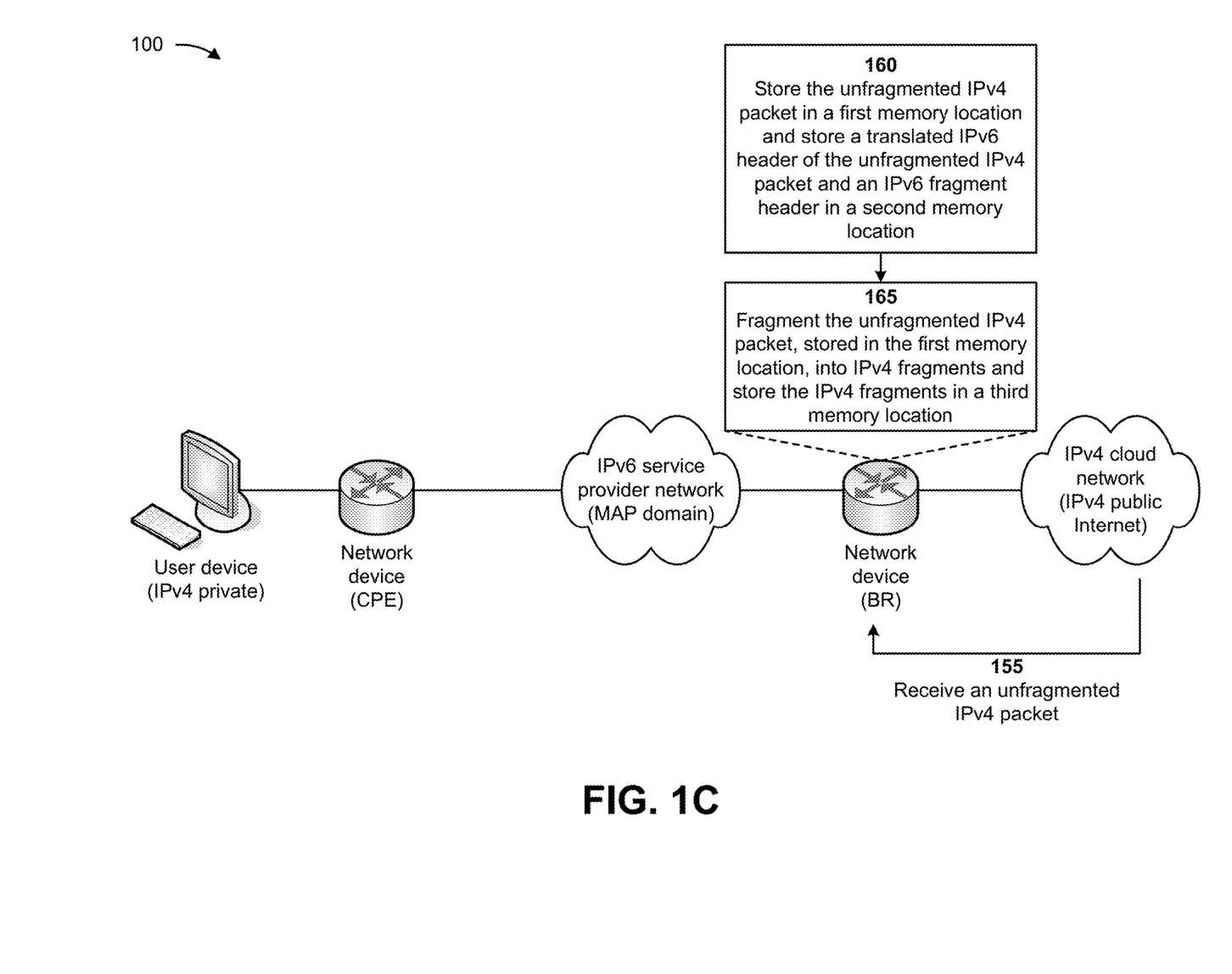

As shown in FIG. 1C, and by reference number 155, the BR may receive an unfragmented IPv4 packet. For example, a device associated with the IPv4 cloud network may generate an IPv4 traffic flow (e.g., the unfragmented IPv4 packet) that is to be provided to the user device, and may provide the unfragmented IPv4 packet to the BR. The BR may receive the unfragmented IPv4 packet from the IPv4 cloud network. In some implementations, the unfragmented IPv4 packet may have a size that is greater than a MAP-T IPv6 MTU (e.g., which determines whether IPv4 packets need to be fragmented). Thus, the BR may determine that the unfragmented IPv4 packet needs to be fragmented. In some implementations, the MTU may include forty-eight (48) bytes (e.g., forty (40) bytes for an IPv6 header and eight (8) bytes for an IPv6 fragment header).

As further shown in FIG. 1C, and by reference number 160, the BR may store the unfragmented IPv4 packet in a first memory location and may store a translated IPv6 header of the unfragmented IPv4 packet and an IPv6 fragment header in a second memory location. For example, the BR may create the translated IPv6 header from a header of the unfragmented IPv4 packet and may create the IPv6 fragment header based on the translated IPv6 header. The translated IPv6 header may include source and/or destination port information, and the IPv6 fragment header may include all values set to zero. The BR may store the unfragmented IPv4 packet in the first memory location of the BR, and may store the translated IPv6 header of the unfragmented IPv4 packet and the IPv6 fragment header in the second memory location of the BR.

As further shown in FIG. 1C, and by reference number 165, the BR may fragment the unfragmented IPv4 packet, stored in the first memory location, into IPv4 fragments, and may store the IPv4 fragments in a third memory location. For example, when the unfragmented IPv4 packet includes the size that is greater than a MAP-T IPv6 MTU, the BR may fragment the unfragmented IPv4 packet, stored in the first memory location, into the IPv4 fragments. The BR may store the IPv4 fragments in the third memory location of the BR.

Figure 1D:
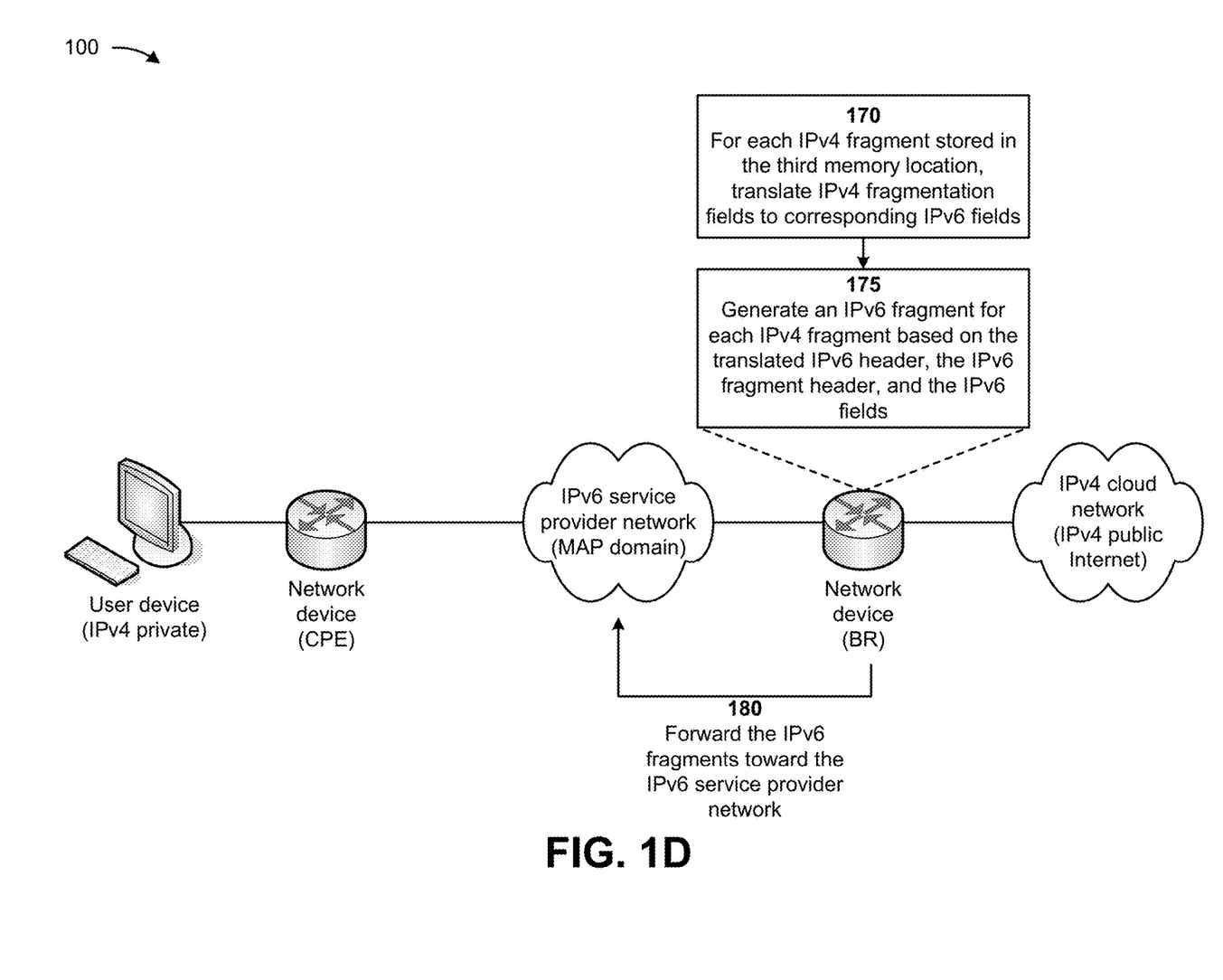

As shown in FIG. 1D, and by reference number 170, the BR may, for each IPv4 fragment stored in the third memory location, translate IPv4 fragmentation fields to corresponding IPv6 fields. For example, each IPv4 fragment, stored in the third memory location of the BR, may include the IPv4 fragmentation fields, such as an identification field (e.g., an identification number unique for a combination of source and destination addresses), an offset field (e.g., used to indicate a starting position of data in the fragment in relation to a starting position of data in the unfragmented packet), flag fields, and/or the like. The BR may translate the IPv4 fragmentation fields to the corresponding IPv6 fields, such as an identification field, an offset field, flag fields, and/or the like.

As further shown in FIG. 1D, and by reference number 175, the BR may generate an IPv6 fragment for each IPv4 fragment based on the translated IPv6 header, the IPv6 fragment header, and the IPv6 fields. For example, the BR may combine the translated IPv6 header, the IPv6 fragment header, and the IPv6 fields, associated with a first IPv4 fragment, to generate a first IPv6 fragment for the first IPv4 fragment. The BR may store the first IPv6 fragment in the second memory location of the BR until the first IPv6 fragment is forwarded from the BR toward the IPv6 SP network (e.g., cleared from the second memory location). The BR may then combine the translated IPv6 header, the IPv6 fragment header, and the IPv6 fields, associated with a second IPv4 fragment, to generate a second IPv6 fragment for the second IPv4 fragment. The BR may store the second IPv6 fragment in the second memory location of the BR until the second IPv6 fragment is forwarded from the BR toward the IPv6 SP network. This process of generating an IPv6 fragment, storing the IPv6 fragment in the second memory location, and clearing the IPv6 fragment from the second memory location may continue until all of the IPv6 fragments are generated from the IPv4 fragments.

As further shown in FIG. 1D, and by reference number 180, the BR may forward the IPv6 fragments toward the IPv6 SP network. For example, the BR may forward the IPv6 fragments (e.g., one by one) toward a destination address associated with IPv6 SP network. In some implementations, the destination address may be associated with the user device communicating with the IPv6 SP network via the CPE, with the CPE communicating with the IPv6 SP network, and/or the like. The BR may forward the IPv6 fragments (e.g., one by one) to the IPv6 SP network, and the IPv6 SP network may forward the IPv6 fragments to the destination address. The CPE may receive the IPv6 fragments from the IPv6 SP network and may translate the IPv6 fragments into the IPv4 fragments. The CPE may reassemble the IPv4 fragments into the unfragmented IPv4 packet, and may provide the unfragmented IPv4 packet to the user device.

In this way, the network device, without native IPv6, transmits and receives IPv6 fragments. For example, the network device may provide stateless solutions that may be utilized in the absence of native IPv6 fragmentation and/or IPv6 reassembly support being provided in the network device. The network device may perform functions that achieve a same end result as MAP-T, but without compromising MAP-T performance. Thus, the network device conserves computing resources, networking resources, and/or the like that would otherwise have been consumed by failing to identify spoofed traffic that causes a network outage or damage to devices, failing to provide native IPv6 fragmentation support for BR downstream traffic, failing to drop spoofed traffic, handling lost traffic caused by failing to perform spoof checks and/or IPv6 fragmentation support, and/or the like.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-ID may perform one or more functions described as being performed by another set of devices shown in FIGS. 1A-1D.

Figure 2:
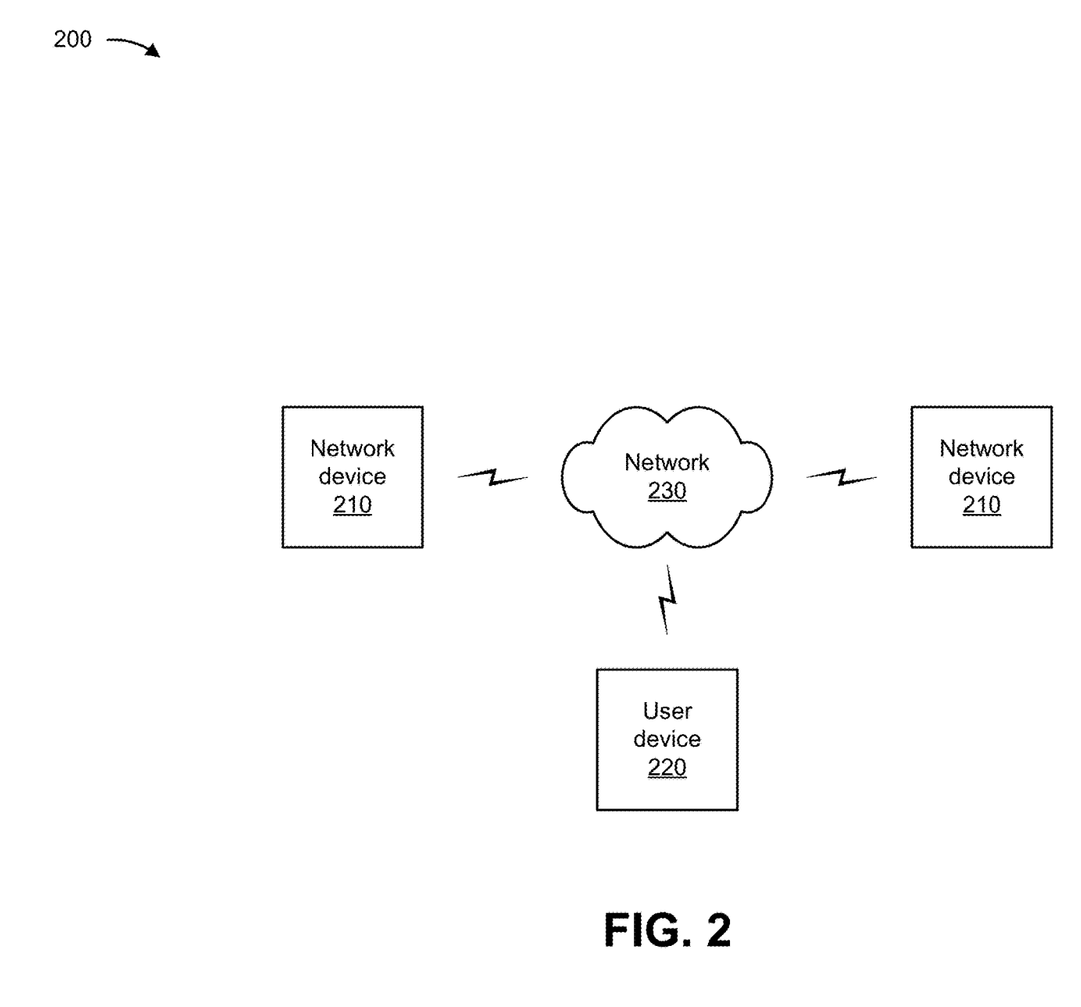
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a group of network devices 210, a user device 220, and a network 230. Devices of the environment 200 may interconnect via wired connections, wireless connections, or a combination of wired and wireless connections.

The network device 210 includes one or more devices capable of receiving, processing, storing, routing, and/or providing traffic (e.g., a packet or other information or metadata) in a manner described herein. For example, the network device 210 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 210 may include a gateway, a switch, a firewall, a hub, a bridge, a reverse proxy, a server (e.g., a proxy server, a cloud server, or a data center server), a load balancer, a CPE, a BR, and/or a similar device. In some implementations, the network device 210 may be a physical device implemented within a housing, such as a chassis. In some implementations, the network device 210 may be a virtual device implemented by one or more computer devices of a cloud computing environment or a data center. In some implementations, a group of network devices 210 may be a group of data center nodes that are used to route traffic flow through the network 230.

The user device 220 includes one or more devices capable of receiving, generating, storing, processing, and/or providing information, as described elsewhere herein. The user device 220 may include a communication device and/or a computing device. For example, the user device 220 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The network 230 includes one or more wired and/or wireless networks. For example, the network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (NAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
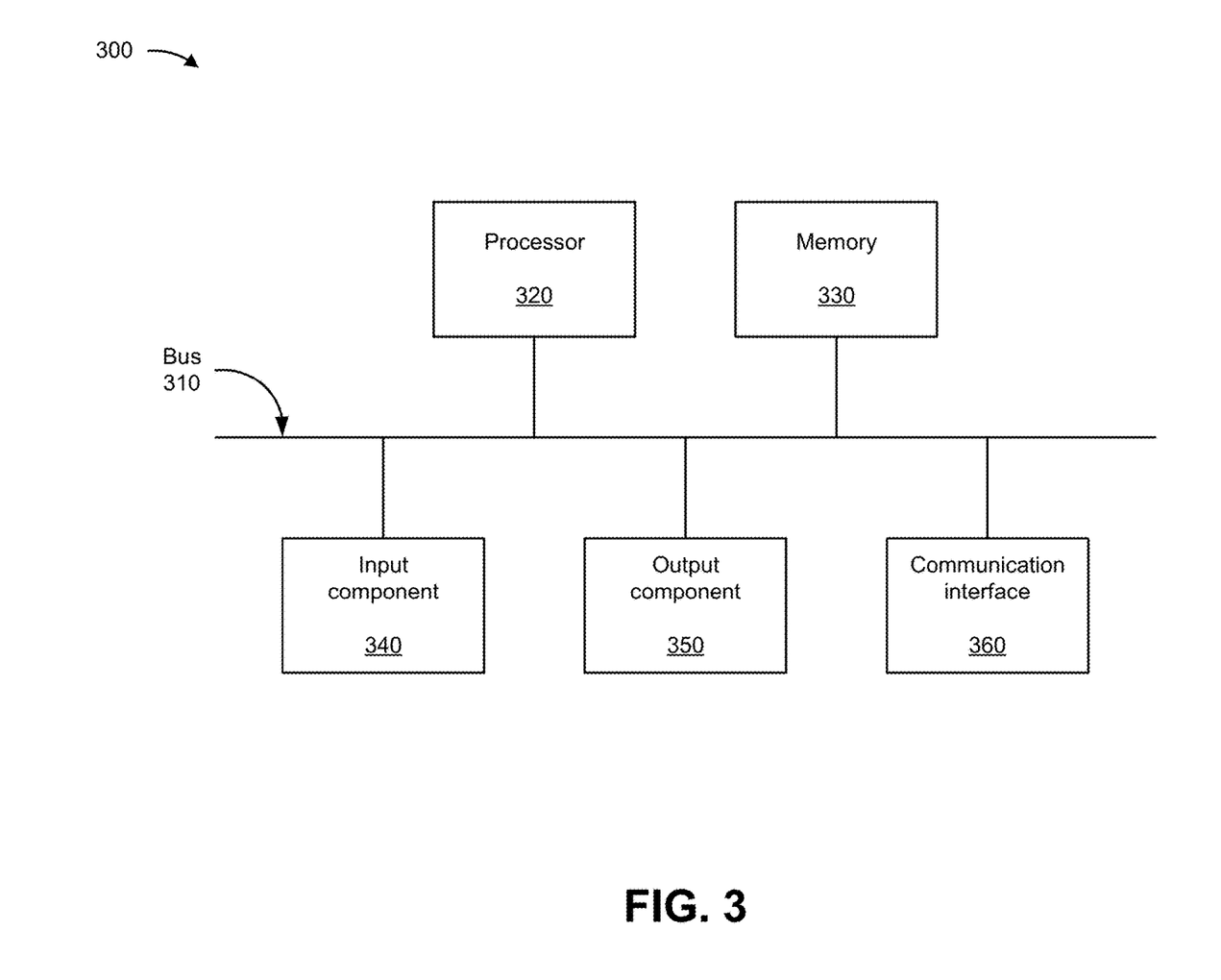
FIGS. 3 and 4 are diagrams of example components of one or more devices of FIG. 2.

FIG. 3 is a diagram of example components of one or more devices of FIG. 2. The example components may be included in a device 300, which may correspond to the network device 210 and/or the user device 220. In some implementations, the network device 210 and/or the user device 220 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hard-wired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
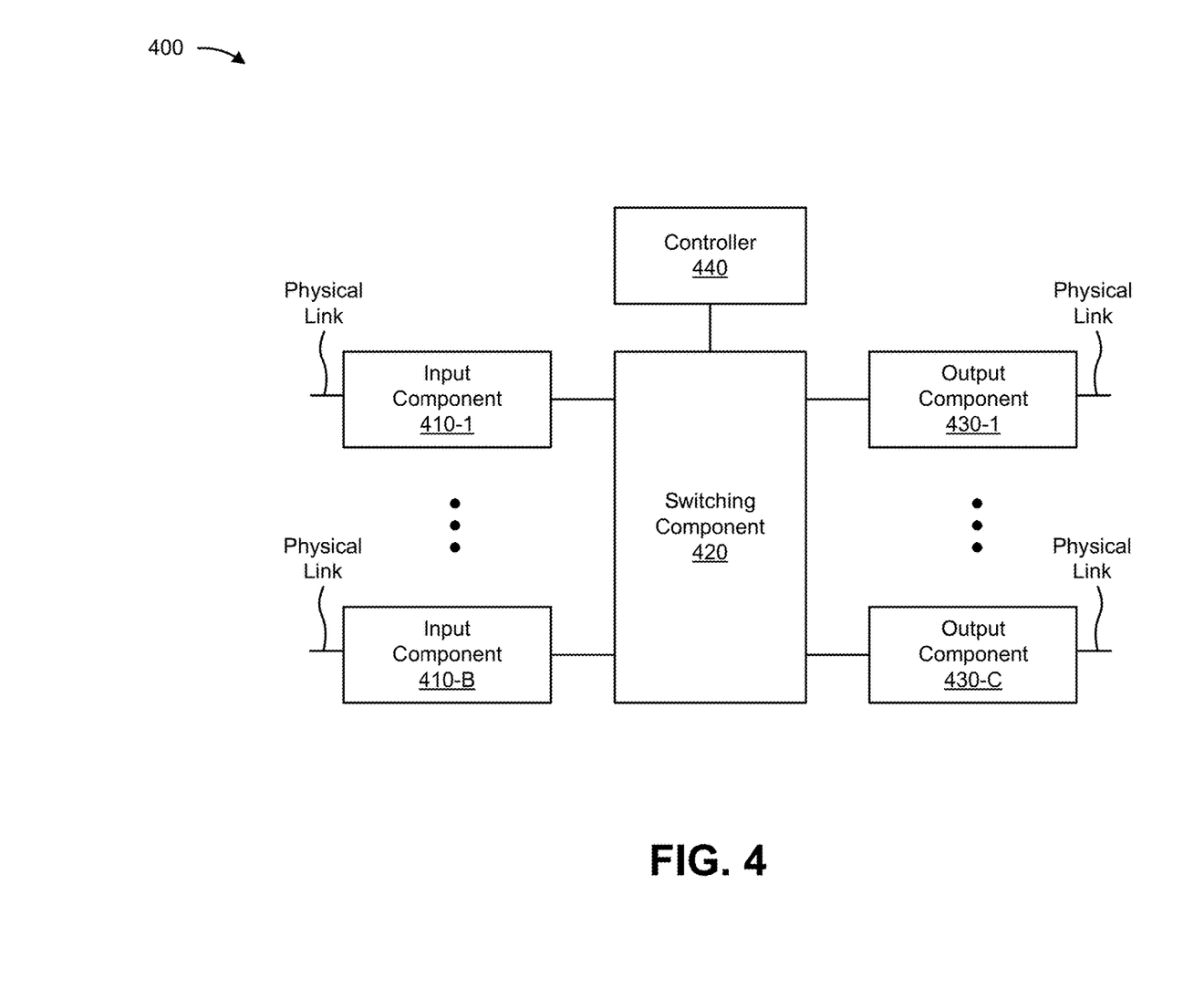

FIG. 4 is a diagram of example components of one or more devices of FIG. 2. The example components may be included in a device 400. The device 400 may correspond to the network device 210. In some implementations, the network device 210 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
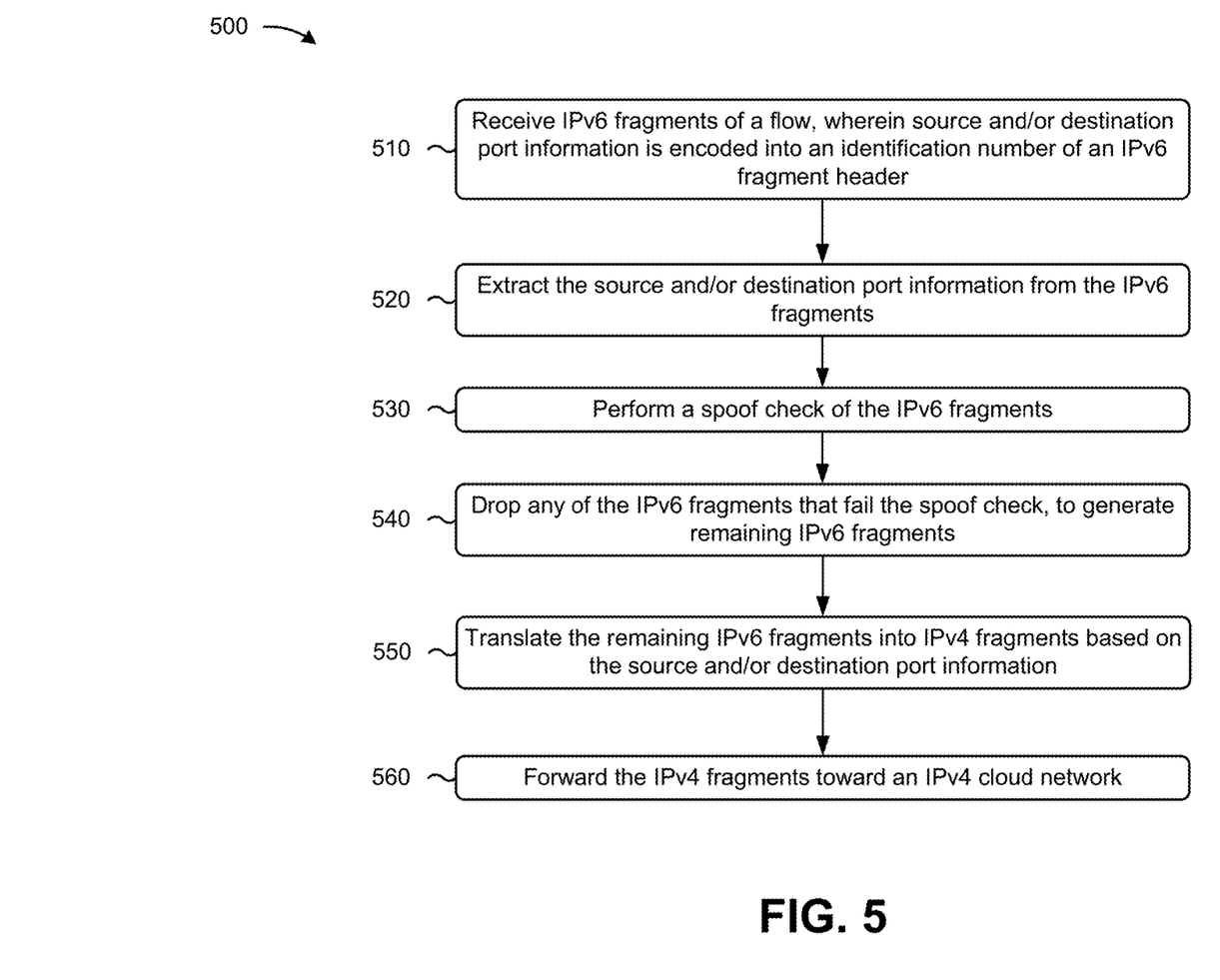
FIG. 5 is a flowchart of an example process for transmitting and receiving IPv6 fragments via a network device without native IPv6.

FIG. 5 is a flowchart of an example process 500 for transmitting and receiving IPv6 fragments via a network device without native IPv6. In some implementations, one or more process blocks of FIG. 5 may be performed by a network device (e.g., the network device 210, such as a BR). In some implementations, one or more process blocks of FIG. 5 may be performed by another device or a group of devices separate from or including the network device, such as a CPE. Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include receiving IPv6 fragments of a flow, wherein source and/or destination port information is encoded into an identification number of an IPv6 fragment header of each of the IPv6 fragments (block 510). For example, the network device may receive IPv6 fragments of a flow, as described above. In some implementations, source and/or destination port information is encoded into an identification number of an IPv6 fragment header of each of the IPv6 fragments. In some implementations, the source and/or destination port information includes Layer 4 source and/or destination port information. In some implementations, the source and/or destination port information is encoded into an upper sixteen bits of the identification number of the IPv6 fragment header of each of the IPv6 fragments.

In some implementations, receiving the IPv6 fragments includes receiving the IPv6 fragments from a customer premises equipment, via an IPv6 service provider network. In some implementations, the customer premises equipment is configured to encode the source and/or destination port information into the identification number of the IPv6 fragment header of each of the IPv6 fragments.

As further shown in FIG. 5, process 500 may include extracting the source and/or destination port information from the IPv6 fragments (block 520). For example, the network device may extract the source and/or destination port information from the IPv6 fragments, as described above.

As further shown in FIG. 5, process 500 may include performing a spoof check of the IPv6 fragments (block 530). For example, the network device may perform a spoof check of the IPv6 fragments, as described above.

As further shown in FIG. 5, process 500 may include dropping any of the IPv6 fragments that fail the spoof check, to generate remaining IPv6 fragments (block 540). For example, the network device may drop any of the IPv6 fragments that fail the spoof check, to generate remaining IPv6 fragments, as described above.

As further shown in FIG. 5, process 500 may include translating the remaining IPv6 fragments into IPv4 fragments based on the source and/or destination port information (block 550). For example, the network device may translate the remaining IPv6 fragments into IPv4 fragments based on the source and/or destination port information, as described above. In some implementations, translating the remaining IPv6 fragments into the IPv4 fragments includes translating the remaining IPv6 fragments into the IPv4 fragments based on mappings of addresses and ports using a translation standard.

As further shown in FIG. 5, process 500 may include forwarding the IPv4 fragments toward an IPv4 cloud network (block 560). For example, the network device may forward the IPv4 fragments toward an IPv4 cloud network, as described above.

In some implementations, process 500 includes receiving additional IPv6 fragments of an additional flow, performing the spoof check on a first additional IPv6 fragment of the additional flow, and based on the first additional IPv6 fragment failing the spoof check, dropping the first additional IPv6 fragment. In some implementations, process 500 includes translating remaining additional IPv6 fragments and the first additional IPv6 fragment, based on the first additional IPv6 fragment passing the spoof check, into additional IPv4 fragments, and forwarding the additional IPv4 fragments toward the IPv4 cloud network. In some implementations, receiving the additional IPv6 fragments includes receiving the additional IPv6 fragments from a customer premises equipment, via an IPv6 service provider network.

In some implementations, process 500 includes receiving an unfragmented IPv4 packet, storing the unfragmented IPv4 packet in a first memory location of the network device; storing a translated IPv6 header of the unfragmented IPv4 packet and an IPv6 fragment header in a second memory location of the network device; fragmenting the unfragmented IPv4 packet, stored in the first memory location, into additional IPv4 fragments; and storing the additional IPv4 fragments in a third memory location of the network device. In some implementations, process 500 includes translating IPv4 fragmentation fields, of each of the additional IPv4 fragments, to corresponding IPv6 fields, generating an additional IPv6 fragment for each of the additional IPv4 fragments based on the translated IPv6 header, the IPv6 fragment header, and the IPv6 fields, to generate additional IPv6 fragments, and forwarding the additional IPv6 fragments toward an IPv6 service provider network. In some implementations, receiving the unfragmented IPv4 packet includes receiving the unfragmented IPv4 packet from the IPv4 cloud network.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a network device, Internet protocol version 6 (IPv6) fragments of a flow,
wherein source and/or destination port information is encoded into an identification number of an IPv6 fragment header of each of the IPv6 fragments;
extracting, by the network device, the source and/or destination port information from the IPv6 fragments;
performing, by the network device, a spoof check of the IPv6 fragments;
dropping, by the network device, any of the IPv6 fragments that fail the spoof check, to generate remaining IPv6 fragments;
translating, by the network device, the remaining IPv6 fragments into IP version 4 (IPv4) fragments based on the source and/or destination port information; and
forwarding, by the network device, the IPv4 fragments toward an IPv4 cloud network.

2. The method of claim 1, further comprising:
receiving additional IPv6 fragments of an additional flow;
performing the spoof check on a first additional IPv6 fragment of the additional flow; and
based on the first additional IPv6 fragment failing the spoof check, dropping the first additional IPv6 fragment.

3. The method of claim 2, further comprising:
translating remaining additional IPv6 fragments and the first additional IPv6 fragment, based on the first additional IPv6 fragment passing the spoof check, into additional IPv4 fragments; and
forwarding the additional IPv4 fragments toward the IPv4 cloud network.

4. The method of claim 2, wherein receiving the additional IPv6 fragments comprises:
receiving the additional IPv6 fragments from a customer premises equipment, via an IPv6 service provider network.

5. The method of claim 1, further comprising:
receiving an unfragmented IPv4 packet;
storing the unfragmented IPv4 packet in a first memory location of the network device;
storing a translated IPv6 header of the unfragmented IPv4 packet and an IPv6 fragment header in a second memory location of the network device;
fragmenting the unfragmented IPv4 packet, stored in the first memory location, into additional IPv4 fragments; and
storing the additional IPv4 fragments in a third memory location of the network device.

6. The method of claim 5, further comprising:
translating IPv4 fragmentation fields, of each of the additional IPv4 fragments, to corresponding IPv6 fields;
generating an additional IPv6 fragment for each of the additional IPv4 fragments based on the translated IPv6 header, the IPv6 fragment header, and the IPv6 fields, to generate additional IPv6 fragments; and
forwarding the additional IPv6 fragments toward an IPv6 service provider network.

7. The method of claim 5, wherein receiving the unfragmented IPv4 packet comprises:
receiving the unfragmented IPv4 packet from the IPv4 cloud network.

8. A network device, comprising:
one or more memories; and
one or more processors to:
receive Internet protocol version 6 (IPv6) fragments of a flow, wherein source and/or destination port information is encoded into an identification number of an IPv6 fragment header of each of the IPv6 fragments;
extract the source and/or destination port information from the IPv6 fragments;
perform a spoof check of the IPv6 fragments;
drop any of the IPv6 fragments that fail the spoof check, to generate remaining IPv6 fragments;
translate the remaining IPv6 fragments into IP version 4 (IPv4) fragments based on the source and/or destination port information; and
forward the IPv4 fragments toward an IPv4 public Internet.

9. The network device of claim 8, wherein the source and/or destination port information includes Layer 4 source and/or destination port information.

10. The network device of claim 8, wherein the one or more processors, to receive the IPv6 fragments, are to:
receive the IPv6 fragments from a customer premises equipment, via an IPv6 service provider network.

11. The network device of claim 8, wherein the customer premises equipment is configured to encode the source and/or destination port information into the identification number of the IPv6 fragment header of each of the IPv6 fragments.

12. The network device of claim 8, wherein the one or more processors, to translate the remaining IPv6 fragments into the IPv4 fragments, are to:
translate the remaining IPv6 fragments into the IPv4 fragments based on mappings of addresses and ports using a translation standard.

13. The network device of claim 8, wherein the source and/or destination port information is encoded into an upper sixteen bits of the identification number of the IPv6 fragment header of each of the IPv6 fragments.

14. The network device of claim 8, wherein the network device is a border relay provided between an IPv6 service provider network and the IPv4 public Internet.

15. A non-transitory computer-readable medium storing a set of instructions, the set of instructions comprising:
one or more instructions that, when executed by one or more processors of a network device, cause the network device to:
receive Internet protocol version 6 (IPv6) fragments of a flow;
perform a spoof check on a first IPv6 fragment of the flow;
drop the first IPv6 fragment when the first IPv6 fragment fails the spoof check or maintain the first IPv6 fragment when the first IPv6 fragment passes the spoof check;
translate remaining IPv6 fragments, and the first IPv6 fragment when the first IPv6 fragment passes the spoof check, into IP version 4 (IPv4) fragments; and
forward the IPv4 fragments toward an IPv4 cloud network.

16. The non-transitory computer-readable medium of claim 15, wherein the one or more instructions further cause the network device to:
receive additional IPv6 fragments of an additional flow, wherein source and/or destination port information is encoded into an identification number of an IPv6 fragment header of each of the additional IPv6 fragments;
extract the source and/or destination port information from the additional IPv6 fragments;
perform the spoof check of the additional IPv6 fragments;
drop any of the additional IPv6 fragments that fail the spoof check to generate remaining additional IPv6 fragments;
translate the remaining additional IPv6 fragments into additional IPv4 fragments; and
forward the additional IPv4 fragments toward the IPv4 cloud network.

17. The non-transitory computer-readable medium of claim 15, wherein the one or more instructions further cause the network device to:
receive an unfragmented IPv4 packet;
store the unfragmented IPv4 packet in a first memory location of the network device;
store a translated IPv6 header of the unfragmented IPv4 packet and an IPv6 fragment header in a second memory location of the network device;
fragment the unfragmented IPv4 packet, stored in the first memory location, into additional IPv4 fragments; and
store the additional IPv4 fragments in a third memory location of the network device.

18. The non-transitory computer-readable medium of claim 17, wherein the one or more instructions further cause the network device to:
translate IPv4 fragmentation fields, of each of the additional IPv4 fragments, to corresponding IPv6 fields;
generate an additional IPv6 fragment for each of the additional IPv4 fragments based on the translated IPv6 header, the IPv6 fragment header, and the IPv6 fields, to generate additional IPv6 fragments; and
forward the additional IPv6 fragments toward an IPv6 service provider network.

19. The non-transitory computer-readable medium of claim 17, wherein the one or more instructions, that cause the network device to receive the unfragmented IPv4 packet, cause the network device to:
receive the unfragmented IPv4 packet from the IPv4 cloud network.

20. The non-transitory computer-readable medium of claim 15, wherein the one or more instructions, that cause the network device to receive the IPv6 fragments, cause the network device to:
receive the IPv6 fragments from a customer premises equipment, via an IPv6 service provider network.

* * * * *

UNITED STATES PATENT AND TRADEMARK OFFICE
CERTIFICATE OF CORRECTION

PATENT NO. : 12,170,647 B2  
APPLICATION NO. : 17/849036  
DATED : December 17, 2024  
INVENTOR(S) : Ashish Suresh Ghule et al.

Page 1 of 1

It is certified that error appears in the above-identified patent and that said Letters Patent is hereby corrected as shown below:

In the Claims

In Claim 6, Column 14, Line 55, "header, the IPv6 fragment header, and the IPv6 fields," should be changed to -- header, the IPv6 fragment header, and the corresponding IPv6 fields, --.

Signed and Sealed this  
Twenty-first Day of January, 2025

Coke Morgan Stewart  
*Acting Director of the United States Patent and Trademark Office*